MULTI-FREQUENCY SIGNAL GENERATOR HAVING PLURAL MIXERS IN CASCADE

Filed Feb. 7, 1963 2 Sheets-Sheet 1

INVENTOR.
PAUL WINSOR III

BY

Nelson E. Kimmelman
ATTORNEY

MULTI-FREQUENCY SIGNAL GENERATOR HAVING PLURAL MIXERS IN CASCADE

Filed Feb. 7, 1963

INVENTOR.
PAUL WINSOR III
BY
Nelson E. Kimmelman
ATTORNEY

United States Patent Office 3,188,578
Patented June 8, 1965

3,188,578
MULTI-FREQUENCY SIGNAL GENERATOR HAVING PLURAL MIXERS IN CASCADE

Paul Winsor III, Paoli, Pa., assignor to Auerbach Electronics Corporation, Philadelphia, Pa., a corporation of Pennsylvania Filed Feb. 7, 1963, Ser. No. 256,916
8 Claims. (Cl. 331—39)

This invention relates to a method and apparatus for producing a plurality of signal waves having respective frequencies which are equally spaced from one another.

There are many applications in modern life wherein a large number of equally-spaced signal frequency waves are employed. In various types of signaling systems such as point-to-point communications or general broadcast transmissions the versatility and coverage of the system depends upon the number of signal frequencies that are attainable within a given band. This is especially true in communication systems designed for very high frequency aeronautical broadcast use. The aeronautical radio band is in the vicinity of 108–132 megacycles. In this band, there is a rapidly and ever-increasing need for a large number of channels say, 300–500, spaced apart at intervals of 25 or 50 kilocycles, for example.

It is therefore desired to produce a large number of signal waves equally spaced in frequency from one another. It is also desired that equipment for this purpose use a small number of crystals, relatively simple circuits, simple switching devices, and be relatively free from spurious responses.

Objects of the present invention are to provide:

(1) A novel system for generating a relatively large number of signal waves spaced from one another in frequency at desired intervals.

(2) A novel system for generating a large number of signal waves by using a very small number of crystal-controlled sources.

(3) A system for generating a large number of signal waves equally spaced in frequency by using relatively simple circuits and switching devices.

(4) A system for generating a large number of signal waves equally spaced in frequency by using relatively inexpensive and simple circuits which are free from spurious responses.

(5) A system for generating and switching between a large number of signal waves which lends itself to convenient separation of the switching and the generating portions thereof for remote operation.

(6) A system for generating, one-at-a-time, a large number of signal waves selected in response to a digitally-coded number.

Other objects of the invention will occur to those skilled in the art upon examination of the specification, claims, and drawings, herein in which:

In accordance with one form of my invention, I employ one or more signal sources, which may be crystal-controlled, for example, in conjunction with a number of similar successive frequency conversion stages. The first of these stages includes a frequency combining means such as a heterodyne mixer to which one or more of the signal waves from said number of crystal-controlled sources is applied. The first stage also includes a frequency selective means, such as a high pass filter, coupled to receive the output of the frequency combining means for extracting a desired frequency component therefrom.

In the first stage there are also a number of frequency multiplication means corresponding, in one form, to the number of crystal-controlled sources. These multipliers multiply the frequencies of the respective signals from the said sources by a predetermined factor.

Successive stages also include a frequency combining circuit, a frequency selective circuit coupled thereto and a number of frequency multiplication means. The combining circuit of each of the successive stages is coupled to receive the output of the frequency selective circuit of the previous stage as well as either one of the output waves of the frequency multiplication means of the previous stage. The frequency multiplication means of the successive stages are coupled to receive the respective outputs of the frequency multiplication circuits of the preceding stage. In another form of the invention a single coherent frequency source is used to generate two other signals that are processed similar to the way the two signals in the previous form were processed.

Figure 1:
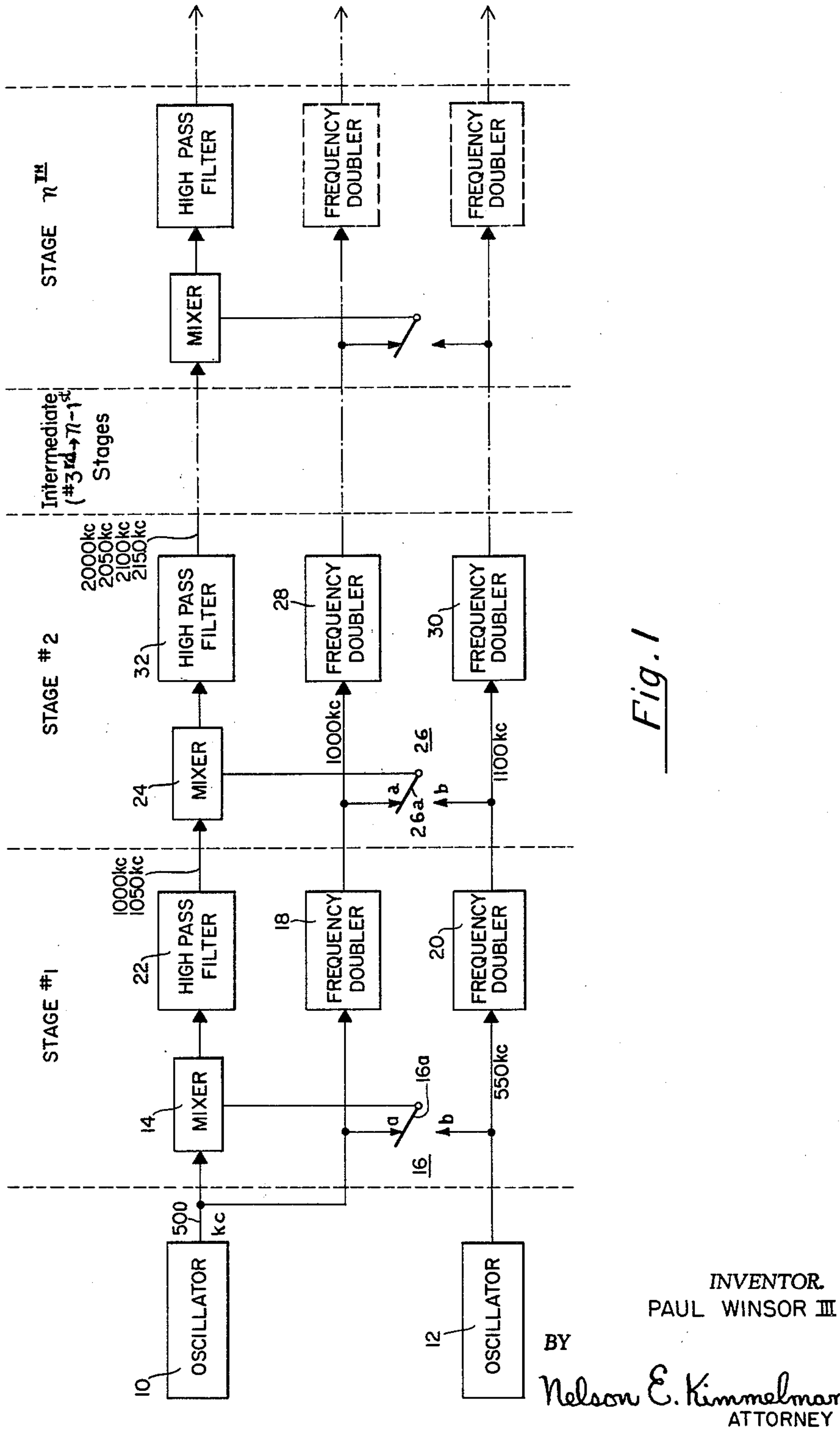
FIGURE 1 is a block diagram of one form of a signal-wave generating system in accordance with my invention.
Figure 2:
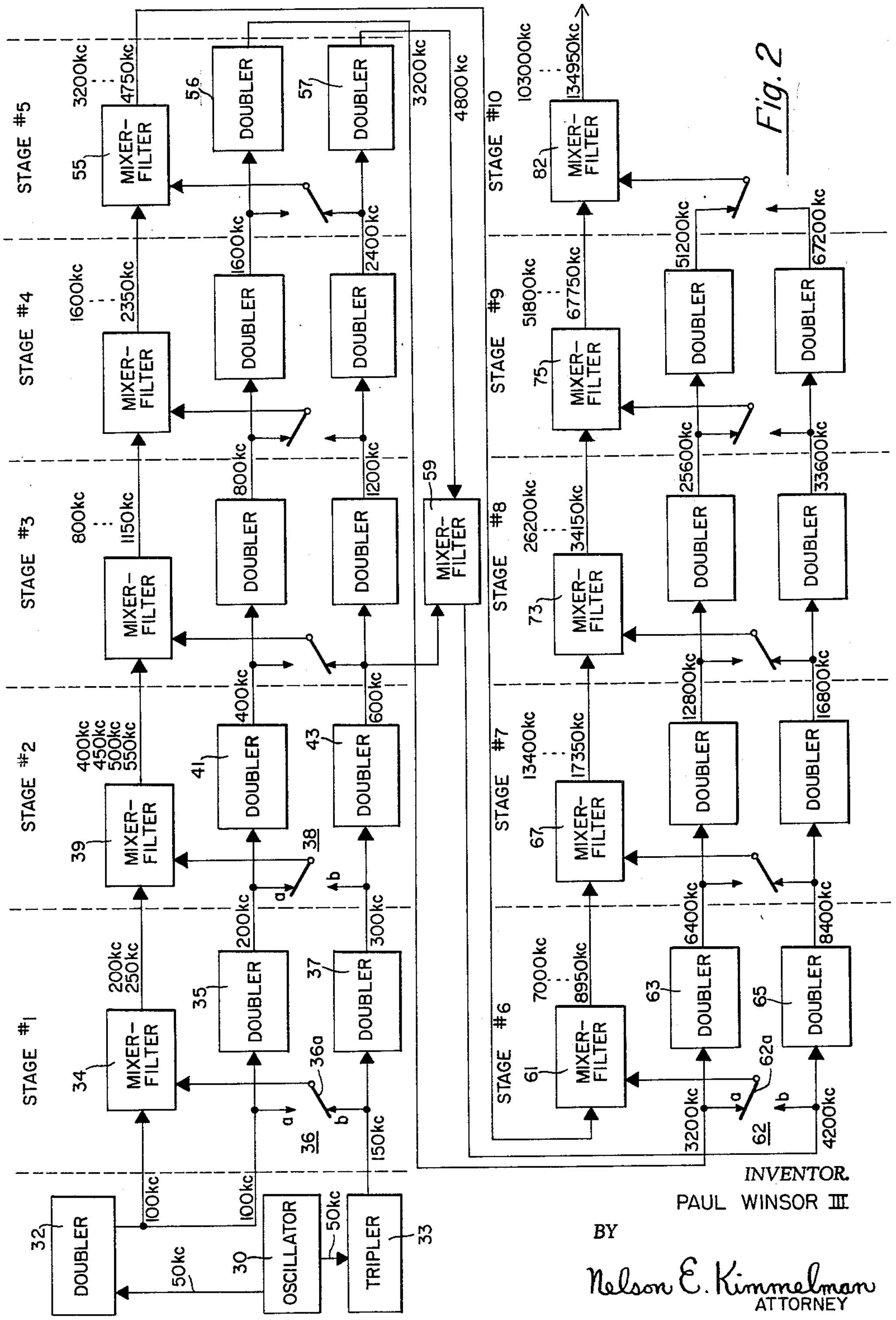
FIGURE 2 is a block diagram of another form of a system for generating a plurality of signal waves which embodies my invention.

Referring to FIGURE 1, there are shown two crystal-controlled oscillators 10 and 12 which, for purposes of illustration only, are assumed to produce output waves at 500 kc. and 550 kc. respectively. The output of the oscillator 10 is applied to one input of a frequency combining circuit 14 such as a conventional balanced mixer, multigrid tube converter, modulator or heterodyne circuit, in which the two input signals are effectively multiplied together to produce sum and difference frequency signals. In a preferred form, the frequency combining circuit 14 would be constructed and arranged to suppress the input frequencies. A suitable circuit for this purpose might employ a Type 7360 beam-deflection tube. One circuit that can be appropriately adapted to this use is shown in FIG. 2 of an application note, Form 7360 dated August, 1959 supplied by Radio Corporation of America. The output of oscillator 10 is also applied to the input of a frequency doubler 18, which may be of conventional construction, and to one contact *a* of a switch 16.

The output of the other oscillator 12 is applied to the input of frequency doubler 20 and also to the contact *b* of switch 16. If the arm 16*a* of the switch 16 is in the *a* position, the mixer 14 will produce in its output a 1,000 kc. wave.

If, on the other hand, the arm 16*a* is thrown to the *b* contact position, the mixer 14 will produce output signals including a 1050 kc. component. The frequency selective circuit 22 is a conventional high pass filter made to reject signals below 1000 kc. but whose frequency response curve shows a relatively gradual "roll off" at the lower frequency end. Therefore, depending upon the position of the switch arm 16*a*, either one of the two signal waves at 1000 kc. or 1050 kc. will appear in the output of filter 22.

Since the output of the oscillator 10 is also applied to the input of the doubler 18, the latter will produce in its output a 1000 kc. wave. The frequency doubler 20 to which the 550 kc. wave is applied will produce a 1100 kc. wave in its output. At the output leads of the first stage there will therefore be three possible frequencies, i.e., 1000 kc., 1050 kc., depending on the setting of switch arm 16*a* and 1000 and 1100 kc. in the outputs of the doublers 18 and 20.

The second stage also has a mixer 24, high pass filter 32, and two frequency doublers 28 and 30. If the arm 26*a* of switch 26 is in the *a* position, and the input to the mixer 24 from filter 22 is 1000 kc. or 1050 kc., the frequency of the output signal of the mixer 24 will correspondingly be either 2000 kc. or 2050 kc. Similarly, when the arm 26*a* is in the *b* position, the frequency of the output signal of the mixer 24 will correspondingly be either 2100 kc. or 2150 kc. Thus the output of the mixer 24 will produce a signal at 2000, 2050, 2100 and 2150 kc. depending on the settings of switches 16 and 26. The filter 32 is constructed to pass all frequencies of 2000 kc. or higher although its frequency response characteristic like that of filter 22 may also have a relatively gradual "roll-off" at its lower frequency end.

There are also provided a number of other intermediate stages indicated in FIG. 1 as the "3rd through *n*—1st stages" which are constructed to be generally similar to the first and second stages. It will be noted that hte number of passed output signal frequencies in the output of the high pass filter in each stage will be doubled compared with the number in the filter output of the previous stage. However, the difference in the frequencies of the signals appearing in the outputs of the respective filters will be constant at 50 kc.

The output of the filter in the *n*th stage will consist of $2^n$ possible frequencies which are separated from one another by 50 kc., the frequency difference between the signals of oscillators 10 and 12. The frequency of the lowest frequency signal of these possible frequencies will be $2^nf$ where $f$ is the frequency which is the frequency applied directly to the mixer of the first stage.

In aeronautical radio applications where the frequency band starts at 118 megacycles and it is desired to have 256 channels, the two crystals could have frequencies of 460.9375 kc. and 510.9375 kc. respectively. This is obtained by dividing 256 into 118,000 kc. By using the system shown in FIG. 1, the output frequencies would then range from 118 mc. to 130.75 mc., separated from one another by 50 kc. intervals.

In the event that fewer than 256 channels are needed or that separation of adjacent channels can be 100 kc. rather than 50 kc., the difference in frequency between the signals produced by the original oscillators could be 100 kc. The lowest frequency in this case would be twice as great as in the case illustrated in FIG. 1 since there would be 7 stages instead of 8 and the crystals would be at 921.875 kc. and 1021.875 kc. This system would provide 128 channels starting at 118 mc. with 100 kc. spacing.

The system just described produces a number of high frequencies at regularly spaced frequency intervals. If desired, however, the system in FIG. 1 could be relatively simply adapted for producing a number of low frequency waves. For example, if the output frequencies of the system shown in FIG. 1 are between 128,000 and 140,750 kcs., it is possible to heterodyne the various signal waves within this range with the 128,000 kc. signal from the *n*th frequency doubler from the *n*th stage. Then, instead of passing the various output frequencies through a high pass filter, the difference frequencies could be extracted by using a low pass filter in the output of the mixer. Since the reference frequency 128,000 kc. signal is derived from the same crystals that is used to generate the various frequencies up to 140,750 kc., no problem of differential drift factors produced by signals from different sources (which is common with ordinary beat frequency oscillators) is presented.

Another possibility would be to employ two systems each having the same components as shown in FIG. 1 and to heterodyne the various signals produced in each system with one another to derive the desired sum or difference frequencies.

FIGURE 2 SYSTEM

In the system shown in FIG. 1 two crystals were used and the frequencies were binary-coded. Under certain circumstances it may be desirable to employ a single crystal and produce decimally-coded output signals in the frequency range from 108–132 mcs. A system which does this is shown in the form of my invention shown in FIG. 2 wherein there is provided a single crystal oscillator 30 operating at 50 kc. One 50 kc. output is applied to frequency doubler 32 and the other is applied to a frequency tripler 33, both the doubler and the tripler being of conventional construction. The output of the doubler 32 is applied to one input of a mixer (or heterodyne circuit) and a high pass filter (to pass 200 kc. and above) coupled to receive its output. For convenience of illustration, this is shown in FIG. 2 as the combined mixer-filter 34 and the subsequent corresponding circuit are similarly presented. The output of doubler 32 is also applied to the input of doubler 35 and to the *a* contact of switch 36. The output of tripler 33 at 150 kc. is applied to the doubler 37 and to the *b* contact of switch 36. When the switch arm **36*a*** is in the *a* contact position, the mixer-filter 34 will produce a 200 kc. sum signal, whereas when it is in the *b* position it will produce a 250 kc. sum signal.

The 100 kc. and 150 kc. signals from the doubler 32 and tripler 33 are respectively doubled in doublers 35 and 37 and applied to the *a* and *b* contacts of switch 38 as well as to doublers 41 and 43 respectively. The output signals of the mixer-filter 34 are applied to one input of a similar mixer-filter 39 which, depending upon the position of the switch arms **36*a* and 38*a***, will produce output signals at 400 kc., 450 kc., 500 kc. and 550 kc.

The same process is continued in stages 3, 4 and 5 and signals are produced in the outputs of the mixer-filters thereof as shown in the following Table I. In the interest of conserving space, not all of the possible output frequencies of the various stages are shown but rather only a sufficient number of them to indicate generally the range and the spacing of the possible output signal waves.

*Table I*

POSSIBLE MIXER-FILTER STAGE OUTPUT FREQUENCIES IN KILOCYCLES

| Stage #1 | Stage #2 | Stage #3 | Stage #4 | Stage #5 |
|---|---|---|---|---|
| 200 | 400 | 800 | 1600 | 3200 |
| 250 | 450 | 850 | 1650 | 3250 |
| | 500 | 900 | 1700 | 3300 |
| | 550 | 950 | 1750 | 3350 |
| | | 1000 | 1800 | 3750 |
| | | 1050 | 1850 | 3800 |
| | | 1100 | 1900 | 3850 |
| | | 1150 | 1950 | ---------- |
| | | | 2000 | ---------- |
| | | | 2050 | ---------- |
| | | | 2100 | ---------- |
| | | | 2150 | ---------- |
| | | | 2200 | ---------- |
| | | | 2250 | 4650 |
| | | | 2300 | 4700 |
| | | | 2350 | 4750 |

As will be seen from FIG. 2, the output of the mixer-filter 55 includes possible frequencies ranging from 3200 kc. to 4750 kc. In the particular form of the invention shown in FIG. 2, however, the switches of the preceding stages need only be set so as to produce at the output of mixer-filter 55 twenty possible frequencies ranging from 3800 kc. to 4750 kc. and spaced at 50 kc. intervals which is equivalent to a bandwidth of one megacycle. In the form of the invention shown in FIG. 2, to obtain the desired decimally-coded output signals having frequencies in the range from 108–132 megacycles and having 50 kc. separation, it is necessary (as will become evident from the explanation and description below) to supply to the inputs of the doublers 63 and 65 of stage #6 respective signals differing in frequency from one another by one megacycle. It will also be seen from the explanation that follows that if the input signals to the doublers 63 and 65 are chosen to have frequencies of 3200 kc. and 4200 kc. respectively, the desired output frequencies in stage #10 will be obtained.

Since a signal at 3200 kc. is already available at the output of the doubler 56 (stage #5) it is only necessary to generate a 4200 kc. signal. This 4200 kc. signal is obtained in one possible way by mixing the output signals of the doubler 43 and the doubler 57 which are at 600 kc. and 4800 kc. respectively. Another way of obtaining the 4200 kc. signal would be to apply the output of the doubler of stage #3 (which is coupled to doubler 43) to a tripler to produce a 3600 kc. signal that could then be heterodyned with the 600 kc. signal from doubler 43 to produce a sum frequency. Still other ways are, of course, possible to obtain the 4200 kc. signal. The mixer-filter 59 is designed to supply the 4200 kc. difference frequency signal to the doubler 65 and to the *b* contact of the switch 62. When this switch arm 62*a* is in the *a* contact position the mixer-filter 61 will produce frequencies at 50 kc. intervals from 7000 kc. to 7950 kc.; in the *b* position it will produce frequencies from 8000 kc. to 8950 kc. The successive stages 7, 8, and 9 are similar to the stage #6 and produce in the outputs of their respective mixer-filters, signal frequencies some of which are shown in Table 2, herein. A number of such frequencies are omitted from that table for the sake of compactness. In the final stage #10 the output of the mixer-filter will include frequencies from 103,000 kc. to 134,950 kc. in steps of 50 kc. For the aeronautical band it is only necessary to use frequencies in the 108,000 kc. to 132,000 kc. band.

*Table II*

POSSIBLE MIXER-FILTER STAGE OUTPUT FREQUENCIES IN KILOCYCLES

| Stage #6 | Stage #7 | Stage #8 | Stage #9 | Stage #10 |
|---|---|---|---|---|
| 7000 | 13,400 | 26,200 | 51,800 | 103,000 |
| 7050 | 13,450 | 26,250 | 51,850 | 103,050 |
| 7100 | -------- | -------- | -------- | -------- |
| -------- | -------- | -------- | -------- | -------- |
| -------- | 15,350 | 30,100 | 59,700 | 108,000 |
| -------- | 15,400 | 30,150 | 59,750 | 108,050 |
| 7900 | -------- | -------- | -------- | -------- |
| -------- | 15,450 | 30,200 | 59,800 | -------- |
| 7950 | -------- | -------- | -------- | -------- |
| -------- | -------- | 30,250 | 59,850 | -------- |
| 8000 | -------- | -------- | -------- | -------- |
| -------- | -------- | -------- | -------- | 118,900 |
| 8050 | -------- | -------- | -------- | -------- |
| -------- | -------- | -------- | -------- | 118,950 |
| -------- | -------- | -------- | -------- | 119,000 |
| -------- | -------- | -------- | -------- | 119,050 |
| -------- | -------- | -------- | -------- | -------- |
| -------- | -------- | -------- | -------- | -------- |
| -------- | -------- | -------- | -------- | 131,050 |
| -------- | -------- | -------- | -------- | 132,000 |
| -------- | -------- | -------- | -------- | -------- |
| -------- | -------- | -------- | -------- | -------- |
| -------- | -------- | -------- | -------- | -------- |
| 8900 | 17,300 | 34,100 | 67,700 | 134,900 |
| 8950 | 17,350 | 34,150 | 67,750 | 134,950 |

The system described in FIG. 2 has the advantage of employing a single oscillator for the whole band and hence it can be of high stability. All circuit components may be identical with the exception of the filters and the tuned circuits of the doublers so that design, construction and repairs may be facilitated. For example, the active components of each stage may be identical modules whereas the filters and tuned circuits can be permanently incorporated since they are passive and unlikely to fail.

It is also possible to employ relays as the switching elements (switches 36 or 38, for example) associated with the frequency-generating components themselves so that separate selector switches may be placed near the aircraft instrument panel, for example, and the frequency-generation apparatus including the relays can be located in some less valuable space. Since the connections between the two are D.-C., there are no problems of parasitics or shielding to be overcome. By means of such remote switching, if desired, it would be possible to choose between either of two preset frequencies by having two independent sets of frequency selector switches and a toggle switch to choose between them. This system also permits the use of programmed frequency selection by using punched cards or tape or other types of remote control signals to control the switches. In addition, the frequency selection can be controlled by computer as for example where communications are to be sent with high security or must be switched rapidly to avoid "jamming."

GENERAL REMARKS

The systems shown have employed crystal oscillators, but should not be regarded as being limited thereto. Any other type of extremely stable oscillator will serve just as well, especially in the single oscillator form shown in FIG. 2 wherein there is no problem of differential drift as previously explained. One can use conventional microwave generation devices or a source of a coherent frequency signal such as a maser or a laser with the understanding that the other components of the system would be modified accordingly to account for the much higher frequencies involved.

There are, of course, many different uses for my invention such as the aircraft communications application illustrated, the communications security or anti-jamming application already mentioned, automatic or controlled frequency switching for radar systems, automatic test equipment, check-out systems, automatic digitally-controlled frequency response testing, and many others.

While the systems shown in FIGS. 1 and 2 each used two basic input signals at different frequencies, it is also possible to employ three input signals at different frequencies. For example, in FIG. 1 a 500 kc. signal could be applied to mixer 14, a 525 kc. signal could be applied to doubler 18 and a 550 kc. signal could be applied to doubler 20. The embodiment shown in FIG. 2 could also be modified to accommodate three input signals at three different frequencies in a similar manner. Of course, the various filters and the various tuned circuits would be designed to have the proper frequency characteristics suited to the different possible frequencies produced in these alternative systems.

Another modification that is embraced within the present inventive concept is to employ frequency multiplication means other than doublers. It should be understood that triplers or other multiplying means can be substituted in the various chains. It would, for example, be possible to employ three chains of triplers instead of the two chains of doublers shown in FIGS. 1 and 2. There would also be a corresponding number of input signals, i.e., three instead of the two used in FIG. 2. One input signal would be fed to one input of the first mixer-filter and to the input of the first tripler in the first chain. The second input signal would be applied to the first tripler of the second chain, and the third input signal would be applied to the input of the first tripler of the third chain. A single pole-triple throw switch is provided which is coupled to the other input of the mixer-filter and to the sources of the three input signals so as to enable any one of them to be applied thereto. While this would make the switches slightly more complex and would require three chains instead of two chains of doublers, this would be compensated by the fact that fewer stages would be necessary to produce substantially the same number of spaced output frequencies as were produced by the embodiments of FIGS. 1 and 2. Of course, other multipliers such as frequency quadruplers could alternatively be used in which case there would be four input signals and four chains of quadruplers.

Numerous other modifications and applications of the disclosed invention which do not depart from the essence of my invention will be apparent to those skilled in the art upon perusal of the drawings, specification and claims herein. Consequently, I desire my invention to be limited solely by the appended claims.

I claim:

1. A system for producing a plurality of signal waves spaced in frequency from one another comprising:

(a) a source of a selected number of input signals having different frequencies and (b) a selected number of successive stages each of which includes:

(i) means for combining two signals and producing output signals in response thereto (ii) frequency selective means constructed to pass desired frequency components of said output signals (iii) a first frequency multiplication means (iv) a second frequency multiplication means, and (v) means for applying one of two signals to said combining means, the first of said stages having a first input to its combining means coupled to receive a first of said input signals and a second input thereto to receive via said applying means either said first or a second of said input signals, said first and second multiplication means of said first stage being respectively arranged to multiply said first and second input signals, the following ones of said stages having their respective first inputs to their respective combining means coupled to receive respectively the signals passed by the frequency selective means of the preceding stage and also to receive via said repspective applying means a selected one of the two signals produced respectively by the two frequency multiplication means of the preceding stage, said latter two signals also being respectively applied, to the corresponding multiplication means of the next following stage.

2. A system for producing a plurality of signal waves spaced in frequency from one another comprising:

(a) first means for producing a first signal having a first frequency, (b) second means for producing a second signal having a second frequency, and (c) a selected number of successive frequency conversion stages which severally include:

(i) a mixer, (ii) a frequency selective means coupled to the output of said mixed for extracting a desired frequency component therefrom, (iii) a first frequency multiplication means (iv) a second frequency multiplication means, and (v) switching means for applying either said first or second signal to said mixer.

the first of said stages having a first input to its mixer coupled to receive said first signal and also having a second input thereto coupled to receive via said switching means either said first or second signal, its first frequency multiplication means coupled to operate on said first signal, and its second frequency multiplication means coupled to operate on said second signal, and the following ones of said successive stages having their respective first inputs to their respective mixers coupled to the output of the preceding frequency selective means and via said switching means their second inputs coupled to a selected one of the respective outputs of the two frequency multiplication means of the preceding stage and also having their two frequency multiplication means operative respectively on the output signals of the two frequency multiplication means of the preceding stage.

3. A system for producing a plurality of signal waves spaced in frequency from one another comprising:

(a) a first frequency oscillator for producing a single first signal at a first frequency, (b) a second frequency oscillator for producing a single second signal at a second frequency, and (c) a selected number of successive frequency conversion stages each of which includes:

(i) a mixer capable of producing product signals in response to signals supplied thereto, (ii) frequency selective means constructed to pass desired frequency components of said product signals, (iii) a first frequency multiplying means, (iv) a second frequency multiplication means, and (v) a switch arranged to supply either of two signals to the mixer therein, the first of said stages having its mixer coupled to receive said first signal and having its switch arranged to apply either of said first or second signals to said mixer, said first and second multiplying means thereof being constructed and arranged to multiply respectively said first and second signals, the following ones of said stages having their respective mixers coupled to receive signals passed by the frequency selective means of the preceding stage and having their respective switches coupled to apply a selected one of the output signals of the preceding two frequency multiplying means to said mixed therein, the frequency multiplying means of said following stages being also coupled to receive respectively the multiplied frequency signals from the multiplying means of the previous stage.

4. A system for producing a plurality of signal waves spaced in frequency from one another comprising:

(a) a source of a first single frequency signal at a first frequency, (b) a source of a second single frequency signal at a second frequency, (c) a selected number of successive stages each of which includes:

(i) a mixer for producing product signals in response to signals applied thereto, (ii) a high pass filter constructed to pass frequency components of said product signals above a given frequency, (iii) first and second frequency doublers, and (iv) a switch for applying a selected one of two signals to said mixer, the first of said stages having its mixer coupled to receive said first signal and having its switch constructed to apply a selected one of said first and second signals to said mixer, said first and second doublers being constructed and arranged to duoble the respective frequencies of said first and second signals, and said high pass filter being constructed to pass substantially only product signals which represent the sum of the frequencies of the signals applied to said mixer, the following ones of said stages having their respective mixers coupled to receive the said sum frequency signals from the preceding high pass filter and having their respective switches constructed and arranged to apply a selected one of said two doubled frequencies from the preceding stage to said mixer, said two doubled frequencies also being applied respectively to the two frequency doublers of said following stages.

5. A system for producing a plurality of signal waves spaced from one another by a predetermined frequency difference comprising:

(a) a first oscillator for producing a first signal at a first predetermined single frequency, (b) a second oscillator for producing a second signal at a second predetermined single frequency, the frequencies of said two signals differing by said predetermined frequency difference, (c) a selected number of successive stages each of which includes (i) a mixer for producing product signals in response to signals supplied to first and second inputs thereof, (ii) a high pass filter constructed to pass frequency components of said product signals above a predetermined frequency, (iii) first and second frequency doublers, and (iv) a switch for applying a selected one of two signals to said mixer, said switch in a first condition coupling the input of said first doublers to the second input of said mixer and in a second condition coupling the input of said second doublers to the second input of said mixer, the first of said stages having the first input to its mixer coupled to said first oscillator and the second input thereof coupled to said switch, the high pass filter of said first stage being constructed to pass signals having frequencies equal to or above the sum of the frequencies of said first and second signals, and the doublers of said first stage being constructed to receive said first and second signals respectively, each of the following ones of said stages having the first input to the mixer therein coupled to the output of the preceding high pass filter and also having the second input coupled to the switch of said stage, the frequency doublers of each of said following stages having their inputs respectively coupled to the outputs of the frequency doublers of the preceding stage, the high pass filter of each of said following stages having its input coupled to the output of the mixer in said stage and being constructed to pass signal frequencies equal to and above the sum of the lowest frequencies applied to the inputs of the mixer of said stage.

6. A system for producing a plurality of signal waves spaced in frequency from one another comprising:

(a) an oscillator for producing a first signal at a first single frequency, (b) a frequency doubler to which said first signal is applied, (c) a frequency tripler to which said first signal is also applied, (d) a first plurality of successive stages each of which includes:

(i) a mixer having two inputs and being constructed to produce signals whose frequencies are the sums of frequencies of signals applied thereto, (ii) a high pass filter coupled to the output of said mixer and being constructed to pass frequency components of said sum frequency signals above a given frequency, (iii) two frequency doublers, and (iv) a switch for applying a selected one of two signals to one input of said mixer, the first of said stages having one input of its mixer coupled to said (b) doubler and having its switch constructed and arranged to supply to the other input of said mixer the output either of said (b) doubler or of said tripler, the doublers of said first stage being coupled to receive the output of said (b) doubler and of said tripler respectively, the following ones of said stages having one input of their respective mixers coupled to the output of the filter of the preceding stage and having the other input thereof coupled by the respective switches thereof to the output of a selected one of the doublers of the preceding stage, the doublers of said following stages being respectively coupled to the outputs of the doublers of the preceding stage, (e) means coupled to one doubler of the last of said first plurality of stages and to another doubler of a stage previous thereto for deriving a second signal, (f) a second plurality of additional stages which are substantially identical to the stages of said first plurality, the first stage of said second plurality having one of its doublers coupled to receive the output of one of the two doublers of the preceding stage and the other of its doublers coupled to receive said second signal, the mixer of said first stage having one input thereto coupled to the output of the filter of the previous stage and the other input thereto coupled via said switch to the input of a selected one of the two doublers of said stage, the following ones of said second plurality of stages being arranged substantially identical to the following ones of said first plurality of stages, and (g) a terminal stage coupled to said second plurality of stages and comprising:

(i) a mixer substantially identical to the mixers of said first and second pluralities of stages and having one of its two inputs coupled to receive the output of the filter of the last stage of said second plurality, and (ii) a switch constructed and arranged to apply to the other of the inputs of said last-named mixer a selected one of the outputs of the two doublers of the last stage of said second plurality of stages.

7. The system according to claim 6 wherein said means for deriving said second signal comprises means for heterodying the signal produced by a doubler in the last of said first plurality of stages with the signal produced by the doubler of a stage previous thereto thereby to obtain a difference frequency signal and also includes filter means for passing substantially only said difference frequency to said one of the doublers in the first of said second plurality of stages which receives said second signal.

8. The system according to claim 6 wherein the difference between the output frequencies of the doublers in successive ones of the first plurality of stages and in the second plurality of stages is doubled, the frequency difference between doublers in the stages of said first plurality being a multiple of the difference in frequency between said first and second signals and the frequency difference in the stages of said second plurality being related to the difference between a multiple of said first signal and said second signal.

References Cited by the Examiner

UNITED STATES PATENTS

| | | | |
|---|---|---|---|
| 2,231,634 | 2/41 | Monk | 331—38 |
| 3,023,371 | 2/62 | Balish et al. | 331—38 |

ROY LAKE, *Primary Examiner.*

JOHN KOMINSKI, *Examiner.*